Figure 1:
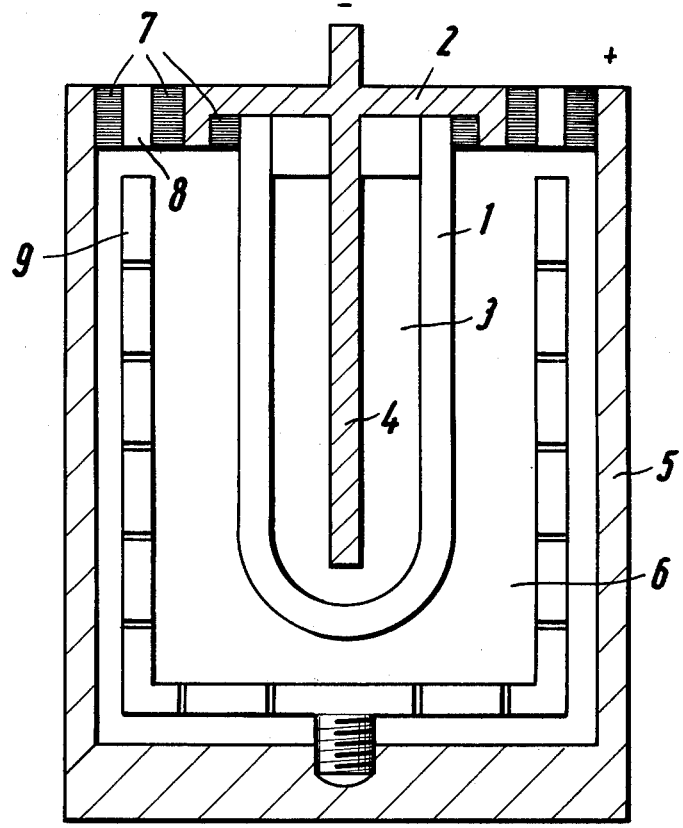

United States Patent [19]

Fischer et al.

[11] 4,029,857

[45] June 14, 1977

[54] ELECTROCHEMICAL STORAGE CELL OR BATTERY

[75] Inventors: Wilfried Fischer, Neckargemund; Wilhelm Haar, Sandhausen; Herbert Kleinschmager, Eppelheim; Gert Weddigen, Kloppenheim, all of Germany

[73] Assignee: Brown, Boveri & Cie. A.G., Mannheim, Germany

[22] Filed: Dec. 5, 1975

[21] Appl. No.: 638,174

[30] Foreign Application Priority Data

Dec. 5, 1974 Germany .......................... 2457418

[52] U.S. Cl. .............................................., 429/104
[51] Int. Cl.² ......................................... H01M 4/36
[58] Field of Search ................ 136/6 FS, 6 F, 83 R, 136/20, 153

[56] References Cited

UNITED STATES PATENTS

| | | | |
|---|---|---|---|
| 3,672,994 | 6/1972 | Mitoff | 136/6 FS |
| 3,770,502 | 11/1973 | Nakabayashi | 136/6 FS |
| 3,811,943 | 5/1974 | Minck et al. | 136/6 FS |
| 3,837,918 | 9/1974 | Nakabayshi | 136/6 FS |
| 3,841,912 | 10/1974 | Kagawa et al. | 136/6 FS |
| 3,939,007 | 2/1976 | Sudworth et al. | 136/6 FS |

*Primary Examiner*—C. F. Lefevour
*Attorney, Agent, or Firm*—Herbert L. Lerner

[57] ABSTRACT

Electrochemical storage cell or battery based on sodium and sulfur having an anode chamber and a cathode chamber separated from each other by a dividing wall capable of conducting sodium ions, is provided with a screening electrode disposed in the chamber containing sulfur as a reactant between the dividing wall and the outer cell wall of said chamber to electrically screen the cell wall and thereby minimize corrosion of the cell wall.

5 Claims, 2 Drawing Figures

ELECTROCHEMICAL STORAGE CELL OR BATTERY

This invention relates to an electrochemical storage cell or battery based on sodium and sulfur with at least one anode chamber and one cathode chamber which are separated from each other by a dividing wall capable of conducting sodium ions, and with an electrode with a current connection provided for each electrode chamber.

Such storage cells or batteries are known as illustrated for example in DT-OS (Deutsche Offenlegungsschrift) 2,316,336. In the known structures, the outer cell wall which is closed gas-tightly to the atmosphere, is also used as one of the electrodes. This construction is advantageous for cells in which the aim is to achieve low weight with a large energy content.

The outer housing of the cell is usually made of high grade steel or aluminum, and is in direct contact with the sulfur or polysulfide in the cells. Corrosion of the outer housing of the cell is a serious problem.

Recent experiments have shown that the outer housing of the cell corrodes rather quickly during current flow. It was found that housing materials exist which do not corrode at all or hardly corrode when in contact with sulfur or sodium polysulfide, at the usual operating temperatures of approximately 300° C for instance, as long as no current is flowing through the polysulfide in the chamber to the housing material.

If, however, current flows, heavy corrosion occurs, which makes itself evident usually by destruction in the form of pits. Aluminum is a typical example of such material which corrodes. Many other common materials used for this purpose behave similarly, but to varying degrees.

An object of the present invention is to protect the metallic cell wall or housing wall from the above-mentioned corrosion-causing factors.

In accordance with the present invention corrosion in the cell wall is eliminated or minimized during current in an electro-chemical storage cell or battery based on sodium and sulfur having a chamber containing sulfur material as a reactant chamber containing sodium as a reactant separated from each other by a dividing wall capable of conducting sodium ions and with each electrode chamber having an electrode with an associated current connection, by disposing an electrode in the chamber containing sulfur material as a reactant between the dividing wall and the cell wall which defines the outside of said chamber to electrically screen the cell wall to minimize corrosion of the cell wall.

The object of the invention is achieved by completely or to a great extent, electrically screening the cell wall which closes the space of the chamber containing sulfur as a reactant to the outside or to the next cell, by means of an electrode which is disposed between the cell wall and the dividing wall.

In this manner, the electric field lines or the ion transport, do not run from the inner dividing wall, which is formed as solid sodium conducting electrolyte, to the cell wall, but end at the screening electrode before reaching the cell wall. The space between the cell wall and the screening electrode which is filled with sulfur or sodium sulfide is therefore without current.

To make certain that there are no stray fields between the dividing wall and the screening electrode which fields eventually increase the corrosion of the metallic cell wall, it is recommended to carry the screening electrode insulated through the base of the cell wall or outer housing.

However, in some cases it may also be sufficient to do without insulation, the advantage being that no special electrical feed through is required and the current connection can be effected on the housing itself.

The screening electrode may be made of any suitable conductor material which is relatively inert to the corrosive effect of sulfur or polysulfide in which it is immersed in the chamber. Metals or metal alloys may be used but the electrode is advantageously made of graphite, which exhibits sufficient corrosion resistance with respect to sulfur or polysulfide.

An advantageous embodiment of an electrochemical storage battery consists of an arrangement of several disc-shaped cells in sequence with each cell consisting of two disc-shaped electrode chambers. In this construction a separating wall made, for example, of beta aluminum oxide and a cell wall made, for example, of steel, alternate with each other.

A single storage cell need not be disc-shaped but can also be cup-shaped. In the case of the latter, the cell wall forms the cup-shaped outer housing in which is disposed the cup-shaped sodium conducting dividing wall. In the preferred configuration the dividing wall is a tube of beta-aluminum oxide which is closed at one end. Positioned between the outer housing and the dividing wall is the screening electrode which is also cup-shaped. Cells of this kind, can be electrically connected externally, thus forming a battery.

In general, it is recommended to construct the screening electrode in such a manner that some mixing of the sulfur or sodium polysulfide-electrolyte is made possible. In the case of a screening electrode made of graphite, for example, holes will be provided; in the case of a screening electrode made of metal, a metallic net may be used.

Other features which are considered as characteristic for the invention are set forth in the appended claims.

Although the invention is illustrated and described herein as embodied in electrochemical storage cell or battery, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of two specific embodiments when read in connection with the accompanying drawings, in which:

FIG. 1 diagramatically illustrates a cup-shaped storage cell; and

Figure 2:
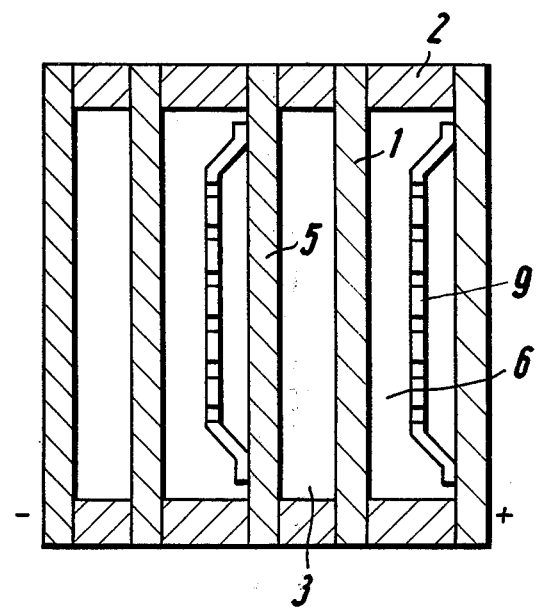

FIG. 2 diagramatically illustrates a battery consisting of several disc cells.

In the sodium-sulfur cell of FIG. 1, the wall which separates the chamber containing sodium as a reactant from the chamber containing sulfur material as a reactant is designated by number 1. In the instant case, it is made of beta-aluminum oxide, which has the required conductivity for sodium ions. The inner space of tube 1 and top or cover 2 form a closed chamber in which one of the reactants is contained, i.e. the liquid sodium designated numeral 3. Into the sodium dips a metallic rod 4 which is connected with top cover 2 as a current carrier. The outside of electrolyte tube 1 forms an annular space with cell wall 5 which contains the second reactant i.e. sodium polysulfide designated by numeral 6. The two electrode chambers are sealed off at the top from each other and from the atmosphere by a conventional sealing compound 7, such as molten potassium-free glass, especially.

Since the glass sealer or sealing compound 7 still displays some electrical conductivity, it is recommended not to connect the metallic cell or housing wall 5 directly through glass sealer 7 with metallic cover 2, but to dispose an insulating ring 8 between them, to block possible ion current. The insulating member 8 can advantageously be made of alpha aluminum oxide; other choices are magnesium-aluminum spinel and oxides of the lanthanide series (rare earth), or mixed oxides of rare earth compounds and aluminum oxides. Furthermore, it is advisable to construct cover 2 of a metal that has a coefficient of thermal expansion similar to the insulating member. If the insulating member consists of alpha aluminum oxide, then the material specifically recommended for the cover is an alloy consisting of 28 weight percent nickel, 23 weight percent cobalt, remainder iron. (This alloy is available from the vacuum smeltery Hanau, Germany under the trade name "Vacon 70".

If aluminum is used for cell wall or housing wall 5, it is recommended to put a shrunk-on ring (not shown) made of metal on the outside of the housing 5 at the height of the insulating ring 8, the expansion coefficient of which is the same or larger than that of the insulating material 8, in order to avoid cracks in the seal. As a material for the cell wall 5, steel may also be used, and it should be matched with respect to its expansion coefficient to insulation material 8 and glass sealer 7. The steel is then covered on the inside with a synthetic vitreous enamel or a glass coating, which exhibit sufficient corrosion resistance to sodium-polysulfide at 300° C.

A cup-shaped screening electrode 9 is fastened by suitable means such as bolts or screws to the cell wall or housing 5. Transfer passages are disposed in electrode 9 to assure a sufficient homogeneity of the reactant, so that all sodium polysulfide contained in the chamber can participate in the electrochemical reaction. The preferred material for screening electrode 9 is graphite.

The screening electrode 9, in addition to being formed of graphite, can also be formed of Inconel 601, consisting of 23% by weight Cr, 14.1% by weight Fe, 1.35% by weight Al and the remainder nickel, and a nickel-chromium-cobalt alloy consisting of 52% by weight Ni, 23% by weight Cr and 15% by weight Co.

In FIG. 2, Numeral 1 designates the dividing wall which consists of a solid electrolyte, such as beta aluminum oxide. The cell wall designated as 5, is preferably made of metal of a material having an expansion coefficient similar to dividing wall 1.

Seal 2 is usually annular in the case of such disc-shaped battery. It may be made of alpha-aluminum oxide, but a metal ring can also be used. Depending on the material, the use of an additional insulation member (not shown in the figure) is recommended.

Such insulation can be obtained in a simple manner by coating separating wall 1 which is made of beta aluminum oxide, in the area where it connects with the sealing part 2, with insulating alpha-aluminum oxide. This coating may be applied by plasma spraying. Screening electrode 9 can, as shown, be directly connected to the cell wall. The conducting cell walls 5 function as electrodes, whereby the outer cell walls are equipped with connectors for current. A great number of disc-shaped cells can be connected in sequence to form a battery.

There is claimed:

1. In an electrochemical storage cell or battery based on sodium and sulfur having a chamber containing sulfur material as a reactant and a chamber containing sodium as a reactant separated from each other by a dividing wall capable of conducting sodium ions and with each said electrode chamber having an electrode with an associated current connection, the improvement which comprises disposing an electrode in said chamber containing sulfur material, said electrode being spaced from said dividing wall and situated between the dividing wall and the cell wall which defines the outside of said chamber containing sulfur material to electrically screen said cell wall to minimize corrosion of said cell wall.

2. Electrochemical storage cell or battery according to claim 1, wherein said screening electrode is insulated when carried through the cell wall to the outside.

3. Electrochemical storage cell or battery, according to claim 1 wherein said screening electrode is made of graphite.

4. Electrochemical storage cell according to claim 1 wherein said dividing wall, said screening electrode and said cell wall are cup-shaped and arranged within each other, with said cell wall forming the outer housing of said cell.

5. Electrochemical storage cell or battery according to claim 1 wherein said electrode chambers are in the form of disc-shaped chambers and a plurality of said disc-shaped electrode chambers are arranged in succession.

* * * * *